US011109429B2

(12) United States Patent
Liu et al.

(10) Patent No.: US 11,109,429 B2
(45) Date of Patent: Aug. 31, 2021

(54) COMMUNICATION METHOD AND TERMINAL DEVICE

(71) Applicant: Guangdong OPPO Mobile Telecommunications Corp., Ltd., Guangdong (CN)

(72) Inventors: Jianhua Liu, Guangdong (CN); Ning Yang, Guangdong (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 0 days.

(21) Appl. No.: 16/491,130

(22) PCT Filed: Mar. 10, 2017

(86) PCT No.: PCT/CN2017/076348
§ 371 (c)(1),
(2) Date: Sep. 4, 2019

(87) PCT Pub. No.: WO2018/161357
PCT Pub. Date: Sep. 13, 2018

(65) Prior Publication Data
US 2020/0015299 A1    Jan. 9, 2020

(51) Int. Cl.
*H04W 76/14* (2018.01)
*H04W 88/04* (2009.01)
*H04W 92/18* (2009.01)

(52) U.S. Cl.
CPC ........... *H04W 76/14* (2018.02); *H04W 88/04* (2013.01); *H04W 92/18* (2013.01)

(58) Field of Classification Search
CPC ......... H04W 36/00–385; H04W 8/005; H04W 76/14; H04W 88/04
See application file for complete search history.

(56) References Cited

U.S. PATENT DOCUMENTS 9,853,875 B1* 12/2017 Oztaskent ............... H04L 43/10
2013/0183963 A1* 7/2013 Turtinen ........... H04W 36/0083
455/426.1
(Continued)

FOREIGN PATENT DOCUMENTS

CN    103298122 A    9/2013
CN    104349283 A    2/2015
(Continued)

OTHER PUBLICATIONS

Extended Search Report for EP Application No. 17899484.4 dated Jan. 16, 2020.
(Continued)

*Primary Examiner* — Gennadiy Tsvey
(74) *Attorney, Agent, or Firm* — Young Basile Hanlon & MacFarlane, P.C.

(57) ABSTRACT

A communication method and a terminal device are provided, and whether two terminal devices are in a same network may be recognized. The method includes: receiving, by a first terminal, indication information sent by a second terminal, wherein the indication information is used for indicating information of a network on which the second terminal currently resides; and determining, by the first terminal, whether the first terminal and the second terminal reside on a same network according to the indication information.

20 Claims, 5 Drawing Sheets

(56) References Cited

U.S. PATENT DOCUMENTS

| | | | |
|---|---|---|---|
| 2014/0148153 A1* | 5/2014 | Gleixner | H04W 4/70 455/426.1 |
| 2014/0171062 A1 | 6/2014 | Fallgren et al. | |
| 2014/0274066 A1* | 9/2014 | Fodor | H04W 36/08 455/437 |
| 2015/0296482 A1 | 10/2015 | Baskar et al. | |
| 2015/0341774 A1* | 11/2015 | Fukuta | H04W 52/283 455/426.1 |
| 2016/0007372 A1* | 1/2016 | Fujishiro | H04W 72/1278 370/329 |
| 2016/0174130 A1* | 6/2016 | Ljung | H04W 88/04 370/315 |
| 2016/0255668 A1* | 9/2016 | Wei | H04W 8/005 455/434 |
| 2016/0323868 A1* | 11/2016 | Kalhan | H04W 72/10 |
| 2017/0142653 A1* | 5/2017 | Qi | H04B 7/2606 |
| 2018/0123682 A1 | 5/2018 | Jung et al. | |

FOREIGN PATENT DOCUMENTS

| | | | |
|---|---|---|---|
| WO | 2016008657 A1 | 1/2016 | |
| WO | WO-2016008657 A1 * | 1/2016 | H04W 52/0212 |
| WO | 2016163823 A1 | 10/2016 | |
| WO | 2016209467 A1 | 12/2016 | |

OTHER PUBLICATIONS

3GPP TS 36.331 V13.0.0 (Dec. 2015);3rd Generation Partnership Project;Technical Specification Group Radio Access Network;Evolved Universal Terrestrial Radio Access (E-UTRA);Radio Resource Control (RRC);Protocol specification; (Release 13).

3GPP TS 23.303 V13.2.0 (Dec. 2015);3rd Generation Partnership Project;Technical Specification Group Services and System Aspects; Proximity-based services (ProSe); Stage 2, Release 13).

Examination for EP Application No. 17899484.4 dated Aug. 18, 2020.

Chile Office Action with English translation of CH Application 2019-002564 dated Sep. 16, 2020.

Communication pursuant to Article 94(3) EPC Examination for EP Application 17899484.4 dated Feb. 24, 2021. (5 pages).

Indonesian Examination Report with English Translation for ID Application P00201908833 dated Feb. 17, 2021. (6 pages).

India Examination Report for IN Application 201917038146 dated Mar. 25, 2021. (6 pages).

Chile Office Action with English Translation for CL Application 2019-002564 dated Jun. 17, 2021. (55 pages).

* cited by examiner

200

S210 — A first terminal receives indication information sent by a second terminal, wherein the indication information is used for indicating information of a network on which the second terminal currently resides S220 — The first terminal determines whether the first terminal and the second terminal reside on a same network according to the indication information

S310 — A second terminal sends indication information to a first terminal, wherein the indication information is used for indicating information of a network on which the second terminal currently resides S320 — The second terminal determines whether the first terminal and the second terminal currently reside on a same network according to a reception time and/or a content of a first message

FIG. 3

COMMUNICATION METHOD AND TERMINAL DEVICE

CROSS-REFERENCE TO RELATED APPLICATION(S)

The present application is a U.S. National Phase Entry of International PCT Application No. PCT/CN2017/076348, having an international filing date of Mar. 10, 2017, the entire content of which is hereby incorporated by reference.

TECHNICAL FIELD

The present disclosure relates to the field of communication, and more specifically, to a communication method and a terminal device.

BACKGROUND

The device-to-device (D2D) technology refers to that terminal devices in vicinity may transmit data through a direct link within a short distance range.

Data transmission between a network device and a remote terminal device may be assisted by a D2D relay. In such a situation, a D2D communication mode may be used between a terminal device used for a D2D relay and the remote terminal device, while a cellular communication mode is used between the terminal device used for the D2D relay and the network device. Herein, a terminal device used for assisting the network device to communicate with the terminal device may be called as a relay terminal device, and the relay terminal device may also directly communicate with the network device without assisting other terminal devices.

SUMMARY

Implementations of the present disclosure provide a communication method and a terminal device, and whether two terminal devices are in a same network may be determined.

In a first aspect, a communication method is provided, including: receiving, by a first terminal, indication information sent by a second terminal, wherein the indication information is used for indicating information of a network on which the second terminal currently resides; and determining, by the first terminal, whether the first terminal and the second terminal reside on a same network according to the indication information.

In combination with the first aspect, in some implementation modes of the first aspect, receiving, by the first terminal, the indication information sent by the second terminal, includes: receiving, by the first terminal, a first message sent by the second terminal, wherein the first message includes the indication information.

In combination with the first aspect, in some implementation modes of the first aspect, determining, by the first terminal, whether the first terminal and the second terminal reside on the same network according to the indication information, includes: determining, by the first terminal, that networks on which the first terminal and the second terminal reside are the same, according to the indication information.

In combination with the first aspect, in some implementation modes of the first aspect, the method further includes: communicating, by the first terminal, with the network on which the first terminal and the second terminal currently reside, through the second terminal.

In combination with the first aspect, in some implementation modes of the first aspect, the method further includes: sending, by the first terminal, a second message to the second terminal, wherein the second message is used for indicating that networks on which the first terminal and the second terminal currently reside are the same.

Optionally, the second message is a discovery message or a direct communication message.

Optionally, determining, by the first terminal, whether the first terminal and the second terminal reside on the same network according to the indication information, includes: determining, by the first terminal, that the networks on which the first terminal and the second terminal reside are different, according to the indication information.

Optionally, in a possible implementation mode, after the first terminal determines that the networks on which the first terminal and the second terminal reside are different according to the indication information, the method further includes: receiving, by the first terminal, indication information sent by other terminals, wherein the indication information is used for indicating indication of networks on which the other terminals currently reside; and finding, by the first terminal, a terminal device on the same network as the first terminal according to the indication information sent by the other terminals.

In combination with the first aspect, in some implementation modes of the first aspect, the method further includes: performing, by the first terminal, a residing action, wherein the residing action is used for making the first terminal reside on the network on which the second terminal currently resides.

In combination with the first aspect, in some implementation modes of the first aspect, the method further includes: communicating, by the first terminal, with the same network through the second terminal, under a situation that the first terminal performs the residing action successfully.

In combination with the first aspect, in some implementation modes of the first aspect, the method further includes: sending, by the first terminal, a third message to the second terminal, wherein the third message is used for indicating that the first terminal has successfully resided on the network on which the second terminal currently resides.

In combination with the first aspect, in some implementation modes of the first aspect, the third message is a discovery message or a direct communication message.

In combination with the first aspect, in some implementation modes of the first aspect, the method further includes: sending, by the first terminal, a fourth message to the second terminal, wherein the fourth message is used for indicating that the first terminal fails in performing the residing action.

In combination with the first aspect, in some implementation modes of the first aspect, the fourth message includes a failure reason and/or information of a network on which the first terminal currently resides, wherein the failure reason includes at least one of the following: a channel quality of the network on which the second terminal currently resides does not meet a preset condition, and the network on which the second terminal currently resides does not allow the first terminal to access.

In combination with the first aspect, in some implementation modes of the first aspect, the fourth message is a discovery message or a direct communication message.

In combination with the first aspect, in some implementation modes of the first aspect, the method further includes: sending, by the first terminal, a fifth message to the second terminal, wherein the fifth message is used for rejecting to reside on the network on which the second terminal currently resides.

In combination with the first aspect, in some implementation modes of the first aspect, the fifth message also includes a rejection reason and/or information of a network on which the first terminal currently resides, wherein the rejection reason includes that networks on which the first terminal and the second terminal currently reside are different.

In combination with the first aspect, in some implementation modes of the first aspect, the fifth message is a discovery message or a direct communication message.

In combination with the first aspect, in some implementation modes of the first aspect, the method also includes: sending, by the first terminal, a sixth message to the second terminal, wherein the sixth message is used for rejecting the first message.

In combination with the first aspect, in some implementation modes of the first aspect, the sixth message includes a rejection reason, wherein the rejection reason includes that networks on which the first terminal and the second terminal currently reside are different.

In combination with the first aspect, in some implementation modes of the first aspect, the same network is any one of the following: a same beam, a cell, a base station, a core network, a Public Land Mobile Network (PLMN), a Tracking Area (TA), a paging area.

In combination with the first aspect, in some implementation modes of the first aspect, the information of the currently-resided network includes at least one of the following: identification information of the currently-resided network, spatial consistency information, and time consistency information, wherein the spatial consistency information indicates whether the currently-resided network is the same as the resided network of last time, and the time consistency information indicates whether the resided network changes within a specific time period.

In combination with the first aspect, in some implementation modes of the first aspect, receiving, by the first terminal, the indication information sent by the second terminal, includes: receiving, by the first terminal, the indication information sent by the second terminal, in case that the second terminal is powered on, or the resided network changes, or a relay service needs to be transmitted.

In a second aspect, a communication method is provided, including: sending, by a second terminal, indication information to a first terminal, wherein the indication information is used for indicating information of a network on which the second terminal currently resides; and determining, by the second terminal, whether the first terminal and the second terminal currently reside on a same network according to a reception time and/or a content of a first message.

In combination with the second aspect, in some implementation modes of the second aspect, sending, by the second terminal, the indication information to the first terminal, includes: sending, by the second terminal, a second message to the first terminal, wherein the second message includes the indication information.

In combination with the second aspect, in some implementation modes of the second aspect, the method also includes: relaying, by the second terminal, data between the first terminal and the same network, under a situation that it is determined that the first terminal and the second terminal reside on the same network.

In combination with the second aspect, in some implementation modes of the second aspect, determining that the first terminal and the second terminal reside on the same network, includes: determining, by the second terminal, that the first terminal and the second terminal currently reside on the same network, under a situation that the content of the first message indicates that networks on which the first terminal and the second terminal currently reside are the same.

In combination with the second aspect, in some implementation modes of the second aspect, determining that the first terminal and the second terminal reside on the same network, includes: determining, by the second terminal, that the first terminal and the second terminal currently reside on the same network, under a situation that the content of the first message indicates that the first terminal has successfully accessed the network on which the second terminal currently resides.

In combination with the second aspect, in some implementation modes of the second aspect, determining, by the second terminal, whether the first terminal and the second terminal currently reside on the same network according to the reception time and/or the content of the first message, includes: determining, by the second terminal, that the first terminal and the second terminal currently reside on different networks, if the content of the first message indicates that the first terminal rejects to access the network on which the second terminal currently resides.

In combination with the second aspect, in some implementation modes of the second aspect, the first message also includes a rejection reason and/or information of a network on which the first terminal currently resides, wherein the rejection reason includes that networks on which the first terminal and the second terminal currently reside are different.

In combination with the second aspect, in some implementation modes of the second aspect, the method also includes: performing, by the second terminal, a residing action according to the information of the network on which the first terminal currently resides included in the first message, wherein the residing action is used for making the second terminal reside on the network on which the first terminal currently resides.

In combination with the second aspect, in some implementation modes of the second aspect, the method also includes: sending, by the second terminal, a third message to the first terminal, wherein the third message is used for indicating that the second terminal has successfully resided on the network on which the first terminal currently resides.

In combination with the second aspect, in some implementation modes of the second aspect, the third message is a discovery message or a direct communication message.

In combination with the second aspect, in some implementation modes of the second aspect, the method also includes: sending, by the second terminal, a fourth message to the first terminal, wherein the fourth message is used for indicating that the second terminal fails in performing the residing action.

In combination with the second aspect, in some implementation modes of the second aspect, the fourth message includes a failure reason, wherein the failure reason including at least one of the following: a channel quality of the network on which the first terminal currently resides does not meet a preset condition, and the network on which the first terminal currently resides does not allow the second terminal to access.

In combination with the second aspect, in some implementation modes of the second aspect, the fourth message is a discovery message or a direct communication message.

In combination with the second aspect, in some implementation modes of the second aspect, the method also includes: receiving, by the second terminal, a fifth message sent by the first terminal, wherein the fifth message is used for rejecting the second message.

In combination with the second aspect, in some implementation modes of the second aspect, determining, by the second terminal, whether the first terminal and the second terminal currently reside on the same network according to the reception time and/or the content of the first message, includes: determining, by the second terminal, that the first terminal and the second terminal currently reside on different networks, if the reception time of the first message is not within a preset time range.

In combination with the second aspect, in some implementation modes of the second aspect, the first message is a discovery message or a direct communication message.

In combination with the second aspect, in some implementation modes of the second aspect, the same network is any one of the following: a same beam, a cell, a base station, a core network, a Public Land Mobile Network (PLMN), a Tracking Area (TA), a paging area.

In combination with the second aspect, in some implementation modes of the second aspect, the information of the currently-resided network includes at least one of the following: identification information of the currently-resided network, spatial consistency information, and time consistency information, wherein the spatial consistency information indicates whether the currently-resided network is the same as the resided network of last time, and the time consistency information indicates whether the resided network changes within a specific time period.

In combination with the second aspect, in some implementation modes of the second aspect, sending, by the second terminal, the indication information to the first terminal, includes: sending the indication information to the first terminal, under a situation that the second terminal is powered on, or the resided network changes, or a relay service needs to be transmitted.

In a third aspect, a communication device is provided, wherein the device includes units for performing the method in the first aspect or various implementation modes of the first aspect.

In a fourth aspect, a communication device is provided, wherein the device includes units for performing the method in the second aspect or various implementation modes of the second aspect.

In a fifth aspect, a communication device is provided, wherein the device includes a memory, a processor and a transceiver, wherein the memory is used for storing programs, the processor is used for executing the programs, and when executing the programs, the processor performs the method of the first aspect based on the transceiver.

In a sixth aspect, a communication device is provided, wherein the device includes a memory, a processor and a transceiver, wherein the memory is used for storing programs, the processor is used for executing the programs, and when executing the programs, the processor performs the method of the second aspect based on the transceiver.

In a seventh aspect, a computer readable medium is provided, which stores program codes for execution by a terminal device, wherein the program codes include instructions for performing the method in the first aspect.

In an eighth aspect, a computer readable medium is provided, which stores program codes for execution by a terminal device, wherein the program codes include instructions for performing the method in the second aspect.

BRIEF DESCRIPTION OF DRAWINGS

FIG. 2 is a flowchart of a communication method according to an implementation of the present disclosure.

FIG. 3 is a flowchart of a communication method according to another implementation of the present disclosure.

DETAILED DESCRIPTION

Hereinafter, technical solutions in implementations of the present disclosure will be described with reference to the accompanying drawings.

It should be understood that the terms "system" and "network" are often used interchangeably herein. The term "and/or" in this document is merely an association relationship describing associated objects, indicating that there may be three relationships, for example, A and/or B, which may indicate three situations: A alone, A and B, and B alone. In addition, the character "/" in this document generally indicates that the objects before and after the character have an "or" relationship.

Figure 1:
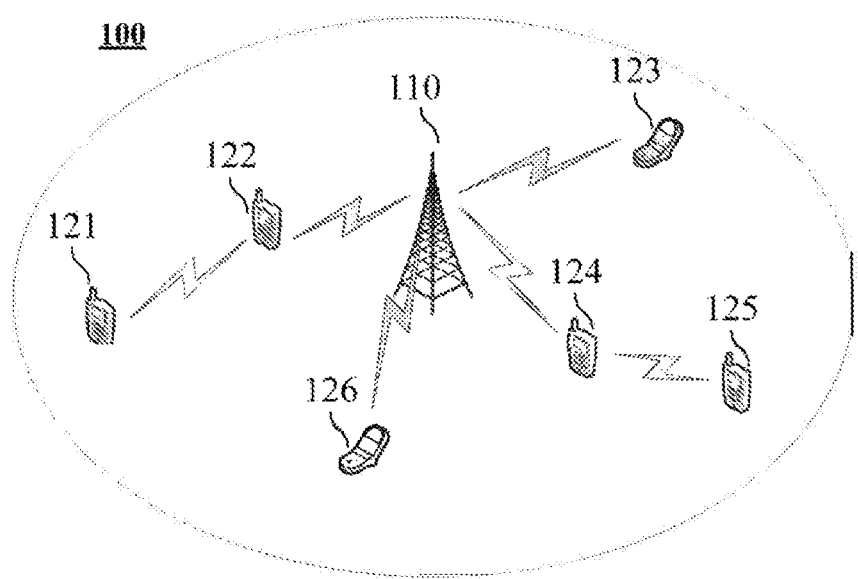
FIG. 1 is a diagram of a radio communication system according to an implementation of the present disclosure.

FIG. 1 is a schematic diagram of a wireless communication system 100 to which implementations of the present disclosure are applicable. The wireless communication system 100 includes at least one network device 110. The network device 100 may be a device that communicates with a terminal device. Each network device 100 may provide communication coverage for a specific geographic area, and may communicate with terminal devices located within the coverage area. The network device 100 may be a Base Transceiver Station (BTS) in a GSM system or CDMA (Code Division Multiple Access) system, a NodeB (NB) in a WCDMA system, an Evolutional Node B (eNB or eNodeB) in an LTE system, or a radio controller in a Cloud Radio Access Network (CRAN). Or, the network device may be a relay station, an access point, an on-board device, or a wearable device, a network device in a future 5G network, or a network device in a future evolved Public Land Mobile Network (PLMN), etc.

The wireless communication system 100 also includes multiple terminal devices, for example, terminal devices 121, 122, 123, 124, 125 and 126 as shown in FIG. 1. The terminal devices may be mobile or fixed. The terminal device may be referred to an access terminal, User Equipment (UE), a subscriber unit, a subscriber station, a mobile station, a remote station, a remote terminal, a mobile device, a user terminal, a terminal, a wireless communication device, a user agent, or a user device. The access terminal may be a cellular phone, a cordless phone, a Session Initiation Protocol (SIP) phone, a Wireless Local Loop (WLL) station, a Personal Digital Assistant (PDA), a handheld device with a wireless communication function, a computing device, or other processing devices connected to a wireless modem, an on-board device, a wearable device, a terminal device in a future 5G network, or a terminal device in a future evolved PLMN, or the like.

FIG. 1 schematically illustrates a network device and six terminal devices. Optionally, the wireless communication system 100 may include multiple network devices and other quantity of terminal devices, and implementations of the present disclosure are not limited thereto. In addition, the wireless communication system 100 may also include other network entities, such as a Mobile Management Entity (MME), a Serving Gateway (S-GW), a Packet Data Network Gateway (P-GW), and implementations of the present disclosure are not limited thereto.

Specifically, the terminal device may communicate in a cellular communication mode or a D2D communication mode. In the cellular communication mode, the terminal device may communicate with other terminal devices through the network device. In the D2D communication mode, the terminal device may directly communicate with other terminal devices through D2D links.

Among the multiple terminal devices shown in FIG. 1, the terminal device 121 and the terminal device 125 may be referred to as remote terminal devices. The terminal device 121 and the terminal device 125 may communicate with the network device 110 through relay terminal devices 122 and 124, respectively. The terminal device 122 and the terminal device 124 may respectively relay data between the remote terminal device 121 and the network device 110 and relay data between and the remote terminal device 125 and the network device 110. In this case, the terminal device 122 and the terminal device 124 may be referred to as relay terminal devices. The relay terminal devices 122 and 124 may directly communicate with the network device without assisting other terminal devices. The terminal device 123 may communicate with the network device 110 neither through the relay terminal device, nor relaying communication between other terminal devices and the network 110.

The terminal devices 122, 123, 124 and 126 have Uu interfaces with the network device 110, and may communicate with the network device 110 by using a cellular communication technology. There is a PC5 interface between the relay terminal device and the remote terminal device, and a D2D communication technology is used for communication between the relay terminal device and the remote terminal device. The D2D communication technology may be specifically a SideLink (SL) technology in the LTE, a WiFi or Bluetooth technology etc., in the WLAN, or other D2D communication technologies, and the implementations of the present disclosure are not limited thereto. The terminal device 121 and the terminal device 125 may directly communicate with the network device 110 without the relay terminal device, and in this case, the terminal device 121 and the terminal device 125 have Uu interfaces with the network device, and may communicate with the network device 110 by using the cellular communication technology.

In an implementation of the present disclosure, when a relay terminal device relays data communication, a remote terminal device and the relay terminal device need to reside on a same cell or a same base station, so that the relay terminal device may submit data of the remote terminal device to a corresponding network device, and how to determine whether two terminal devices are in a same network is an urgent problem to be solved. Therefore, an implementation of the present disclosure provide a communication method, by which the remote terminal device may submit data to an appropriate relay terminal device, so that the data may be submitted to a corresponding network device.

FIG. 2 schematically illustrates a communication method 200 provided by an implementation of the present disclosure. The method 200 may be applied to the wireless communication system 100 described above, but implementations of the present disclosure are not limited thereto.

As shown in FIG. 2, the method 200 includes acts S210 and S220.

In S210, a first terminal receives indication information sent by a second terminal, wherein the indication information is used for indicating information of a network on which the second terminal currently resides.

In S220, the first terminal determines whether the first terminal and the second terminal reside on a same network according to the indication information.

In an implementation of the present disclosure, the first terminal and the second terminal may be any two terminal devices in networks, for example, the first terminal and the second terminal are both remote terminal devices, or the first terminal is a remote terminal device and the second terminal is a relay terminal device, or the first terminal is a relay terminal device and the second terminal is a remote terminal device, which is not restricted in implementations of the present disclosure. The first terminal and the second terminal may determine whether they are in the same network in a manner described in S210 and S220. Specifically, the first terminal may receive the indication information of the second terminal, wherein the indication information indicates information of the network on which the second terminal currently resides, so that the first terminal may determine whether the first terminal and the second terminal reside on the same network according to the indication information.

Optionally, in some implementations, the first terminal may be a remote terminal device and the second terminal is a relay terminal device. The first terminal may decide whether to use the second terminal or other terminals as relay terminal devices between the first terminal and a network device according to situations of the networks on which the first terminal and the second terminal reside. Optionally, if the first terminal and the second terminal reside on the same network, the first terminal may directly send uplink data to a network device on the same network through the second terminal, or a network device on the same network may send downlink data to the first terminal through the second terminal, i.e., the second terminal may serve as a relay terminal device between the first terminal and the network device. Optionally, if the first terminal and the second terminal reside on different networks, therefore, the second terminal cannot be directly used as a relay terminal device between the first terminal and a network device. In such a situation, optionally, the first terminal may search for other terminal devices through the method described in S210 and S220 until a terminal device on the same network as the first terminal is found. Then, the first terminal may use the terminal device as a relay terminal device between the first terminal and the network device. Or, the first terminal may reside on the network on which the second terminal currently resides. In such a situation, the first terminal and the second terminal reside on the same network, so that the second terminal may be used as a relay terminal device between the first terminal and the network device, and thus the first terminal may communicate with the network device through the second terminal.

Optionally, receiving, by the first terminal, the indication information sent by the second terminal, includes: receiving, by the first terminal, a first message sent by the second terminal, wherein the first message includes the indication information.

Specifically, a D2D discovery process is a process in which a terminal device senses and identifies nearby terminal devices. D2D discovery is a prerequisite for a D2D connection establishment. If two devices wish to perform data communication in a form of D2D, the D2D discovery process will be triggered first. Therefore, the second terminal may carry the indication information in a discovery message by sending the discovery message. In other words, the second terminal may notify the first terminal of the information of the network on which the second terminal currently resides in the D2D discovery process. Optionally, the discovery message may be a Discovery Announcement message, a Discovery Solicitation message, or other messages in the discovery message.

Optionally, the second terminal may notify the first terminal of the information of the network on which the second terminal currently resides in a D2D connection establishment process. Or, the second terminal may send a direct communication message including the indication information. Alternatively, the direct communication message may be a direct communication establishment request (DIRECT_COMMUNICATION_REQUEST) message, a direct communication establishment acceptance (DIRECT_COMMUNICATION_ACCEPT) message, or other messages in the direct communication message.

Optionally, after the second terminal receives the first message of the first terminal, if it is determined that the networks on which the first terminal and the second terminal reside are the same according to the indication information, the first terminal may not reply with any response message or may reply with a second message, which is used for notifying the second terminal that the networks on which the first terminal and the second terminal currently reside are the same. For example, if the first message is a discovery request message, the second message may be a Discovery Response message, or if the first message is a direct communication establishment request message, the second message may be a direct communication establishment acceptance message, or if the first message is a direct communication establishment acceptance message, the second message may be a direct communication establishment success message or a direct communication establishment failure message, etc.

Optionally, in some implementations, after the second terminal receives the first message of the first terminal, if it is determined that the networks on which the first terminal and the second terminal reside are different according to the indication information, the first terminal may not reply with any response message, or may try to reside on the network on which the second terminal currently resides. Optionally, if the resident is successful, the first terminal may reply with a third message, wherein the third message is used for notifying the second terminal that the first terminal has successfully resides on the network on which the second terminal currently resides. Optionally, if the residing fails, the first terminal may reply with a fourth message for notifying the second terminal that the first terminal fails to reside. Optionally, the fourth message may also include a failure reason, for example, channel quality of the network on which the second terminal currently resides does not meet a preset condition, or the network on which the second terminal currently resides does not allow the first terminal to access. Optionally, the fourth message may also include information of a network on which the first terminal currently resides. Optionally, if the first message is a discovery request message, the third message may be a discovery response message, or if the first message is a direct communication establishment request message, the third message may be a direct communication establishment acceptance message, or if the first message is a direct communication establishment acceptance message, the third message may be a direct communication establishment success message or a direct communication establishment failure message, etc. Optionally, if the first message is a discovery request message, the fourth message may be a discovery response message, or if the first message is a direct communication establishment request message, the fourth message may be a direct communication establishment reject (DIRECT_COMMUNICATION_REJECT) message, or if the first message is a direct communication establishment acceptance message, the fourth message may be a direct communication establishment failure message, etc.

Optionally, in some implementations, after the second terminal receives the first message of the first terminal, if it is determined that the networks on which the first terminal and the second terminal reside are different according to the indication information, the first terminal may directly reply with a fifth message, wherein the fifth message is used for rejecting to reside on the network on which the second terminal currently resides. Optionally, the fifth message may also include a rejection reason, wherein the rejection reason may be that the networks on which the first terminal and the second terminal currently reside are different. Optionally, the fifth message may also include the information of the network on which the first terminal currently resides. Optionally, if the first message is a discovery request message, the fifth message may be a Discovery Response message, or if the first message is a direct communication establishment request message, the fifth message may be a direct communication establishment rejection message, or if the first message is a direct communication establishment acceptance message, the fifth message may be a direct communication establishment failure message, etc.

Optionally, in some implementations, after the second terminal receives the first message of the first terminal, if it is determined that the networks on which the first terminal and the second terminal reside are different according to the indication information, the first terminal may directly reply with a sixth message, wherein the sixth message is used for rejecting the first message. Optionally, the sixth message may also include a rejection reason, wherein the rejection reason may be that the networks on which the first terminal and the second terminal currently reside are different. Optionally, the sixth message may also include the information of the network on which the first terminal currently resides. Optionally, if the first message is a discovery request message, the sixth message may be used for rejecting the discovery request message, or if the first message is a direct communication establishment request message, the sixth message may be used for rejecting the direct communication establishment request message.

In summary, the fourth message represents that the first terminal fails to reside, the fifth message represents that the first terminal rejects to reside on the network on which the second terminal currently resides, and the sixth message represents that the first message is rejected. Therefore, when the second terminal receives any one of the fourth message, the fifth message or the sixth message, it represents that the first terminal and the second terminal currently reside on different networks. Optionally, the fourth message, the fifth message or the sixth message may include the information of the network on which the first terminal currently resides, so that the second terminal may attempt to reside on the network on which the first terminal currently resides according to the information of the network on which the first terminal currently resides that may be included in the fourth message, the fifth message or the sixth message. If the residing is successful, the second terminal may not reply with any response message. Optionally, the second terminal may reply to the first terminal with a seventh message which is used for indicating that the second terminal resides successfully. If the residing fails, the second terminal may not reply with any response message. Optionally, the second terminal may reply to the first terminal with an eighth message, which is used for indicating that the second terminal fails to reside. Optionally, the eighth message may include a failure reason, wherein the failure reason may include that a channel quality of the network on which the first terminal currently resides does not meet a condition for residing by the second terminal, or the network on which the first terminal currently resides does not allow the second terminal to reside. Optionally, the second terminal may reject to reside on the network on which the first terminal currently resides. In this case, the second terminal may not reply with any response message or may reply with a ninth message, which is used for indicating rejecting to reside on the network on which the first terminal currently resides. Optionally, the second terminal may reply with a tenth message, which is used for rejecting the fourth message, the fifth message or the sixth message.

It should be understood that in an implementation of the present disclosure, messages used for communication between the first terminal and the second terminal, for example, the first message to the tenth message, may all be discovery messages or direct communication messages, or may be other interface messages used for communication between terminal devices, and this is not restricted in implementations of the present disclosure.

Alternatively, in an implementation of the present disclosure, the same network may refer to any one of the following, which is not restricted in implementations of the present disclosure: a same beam, a same cell, a same base station, a same core network, a same Public Land Mobile Network (PLMN), a same Tracking Area (TA), and a same paging area.

In the above, the communication methods of implementations of the present disclosure are introduced as a whole, and actions of the first terminal and the second terminal under each scenario are introduced in detail below.

Optionally, in some implementations, determining, by the first terminal, whether the first terminal and the second terminal reside on the same network according to the indication information, includes: determining, by the first terminal, that networks on which the first terminal and the second terminal reside are the same according to the indication information.

Specifically, the first terminal currently resides on a first network. If the second terminal determines that the second terminal currently resides on a second network according to the indication information, and if the first network and the second network are the same, the first terminal determines that the first terminal and the second terminal reside on the same network.

Optionally, in some implementations, the method 200 further includes: communicating, by the first terminal, with the network on which the first terminal and the second terminal currently reside through the second terminal.

Specifically, if the first terminal determines that the networks on which the first terminal and the second terminal currently reside are the same, in such a situation, the first terminal may communicate with a network device through the second terminal, that is, the second terminal may act as a relay terminal device between the first terminal and the network device.

Optionally, in some implementations, the method 200 further includes: sending, by the first terminal, a second message to the second terminal, wherein the second message is used for indicating that the networks on which the first terminal and the second terminal currently reside are the same.

Specifically, if the first terminal determines that the networks on which the first terminal and the second terminal currently reside are the same, the first terminal may send a second message to the second terminal, informing the second terminal that the networks on which the first terminal and the second terminal currently reside are the same, so that the second terminal may receive uplink data sent by the first terminal to the network device and forward the uplink data to the network device, or the second terminal may receive downlink data sent by the network device to the first terminal and forward the downlink data to the first terminal.

Optionally, in some implementations, the second message is a discovery message or a direct communication message.

In other words, the first terminal may notify the second terminal that the networks on which the first terminal and the second terminal currently reside are the same, by sending a discovery message or a direct communication message. Optionally, the discovery message may be a discovery announcement message or a discovery request message, and the direct communication message may be a direct communication establishment request message or a direct communication establishment acceptance message.

Optionally, after receiving the second message of the first terminal, the second terminal may not reply or may reply with a corresponding response message. For example, if the second message is a discovery request message, the second terminal may reply with a discovery response message, or if the second message is a direct communication establishment request message, the second terminal may reply with a direct communication establishment acceptance message, etc.

Optionally, in some implementations, determining, by the first terminal, whether the first terminal and the second terminal reside on the same network according to the indication information, includes: determining, by the first terminal, that the networks on which the first terminal and the second terminal reside are different according to the indication information.

Optionally, in some implementations, after the first terminal determines that the networks on which the first terminal and the second terminal reside are different according to the indication information, the method further includes: receiving, by the first terminal, indication information sent by other terminals, wherein the indication information is used for indicating information of networks on which the other terminals currently reside; and finding, by the first terminal, a terminal device on the same network as the first terminal according to the indication information sent by the other terminals.

Specifically, after the first terminal determines that the networks on which the first terminal and the second terminal reside are different according to the indication information, the first terminal may continue to receive the indication information of other terminals (e.g., a third terminal), determine whether the third terminal and the first terminal reside on a same network according to the indication information of the third terminal. Optionally, if the third terminal and the first terminal reside on the same network, the first terminal may send uplink data to a network device through the third terminal or receive uplink data from the network device through the third terminal. Optionally, if the third terminal and the first terminal reside on different networks, the first terminal may receive indication information of a fourth terminal, determine whether the fourth terminal and the first terminal reside on a same network, and if the fourth terminal and the first terminal reside on different networks, the first terminal may continue to execute the acts described above until a terminal device located in a same network is found, thereby communicating with a network device through the terminal device.

Optionally, in some implementations, the method 200 further includes: performing, by the first terminal, a residing action, wherein the residing action is used for making the first terminal reside on the network on which the second terminal currently resides.

In this case, the method further includes: communicating, by the first terminal, with the same network through the second terminal, under a situation that the first terminal performs the residing action successfully.

Specifically, if networks on which the first terminal and the second terminal currently reside are different, by making the first terminal reside on the network on which the second terminal currently resides, the first terminal and the second terminal may reside on a same network. The first terminal may send uplink data to a network device or receive downlink data sent by the network device through the second terminal, under a situation that the first terminal resides successfully on the network on which the second terminal currently resides, that is, in case of performing the residing action successfully.

It should be understood that if the first terminal resides on a first network and the second terminal resides on a second network, making the first terminal and the second terminal reside on the same network may include making the first terminal reside on the second network, or making the second terminal reside on the first network, or making both the first terminal and the second terminal reside on a third network.

Optionally, in some implementations, the method further includes: sending, by the first terminal, a third message to the second terminal, wherein the third message is used for indicating that the first terminal has successfully resided on the network on which the second terminal currently resides.

Optionally, if the first terminal successfully resides on the network on which the second terminal currently resides, that is, the residing action is successfully performed, the first terminal may send a third message to the second terminal, wherein the third message is used for notifying the second terminal that the first terminal has successfully resided on the network on which the second terminal currently resides, so that the second terminal may receive uplink data sent by the first terminal to a network device and forward the uplink data to the network device, or the second terminal may receive downlink data sent by the network device to the first terminal and forward the downlink data to the first terminal.

Optionally, the third message is a discovery message or a direct communication message.

That is to say, the first terminal may notify the second terminal that the first terminal has successfully resided on the network on which the second terminal currently resides by sending a discovery message or a direct communication message. Optionally, the discovery message may be a discovery announcement message or a discovery request message, and the direct communication message may be a direct communication establishment request message or a direct communication establishment acceptance message.

Optionally, after receiving the third message of the first terminal, the second terminal may not reply or may reply with a corresponding response message. For example, if the third message is a discovery request message, the second terminal may reply with a discovery response message, or if the third message is a direct communication establishment request message, the second terminal may reply with a direct communication establishment acceptance message.

Optionally, the method 200 further includes: sending, by the first terminal, a fourth message to the second terminal, wherein the fourth message is used for indicating that the first terminal fails in performing the residing action.

Specifically, if the first terminal fails in performing the residing action, the first terminal may send a fourth message to the second terminal, notifying the second terminal through the fourth message that the first terminal fails in performing the residing action. Optionally, the fourth message includes a failure reason and/or information of a network on which the first terminal currently resides, wherein the failure reason includes at least one of the following: a channel quality of the network on which the second terminal currently resides does not meet a preset condition, and the network on which the second terminal currently resides does not allow the first terminal to access. Therefore, the second terminal may attempt to reside on the network on which the first terminal currently resides according to the information of the network on which the first terminal currently resides included in the fourth message, so that the first terminal and the second terminal reside on a same network.

Optionally, similar to the first message, the second message and the third message described above, the fourth message may also be a discovery message or a direct communication message, which will not be repeated here for sake of conciseness.

Optionally, in some implementations, the method 200 further includes: sending, by the first terminal, a fifth message to the second terminal, wherein the fifth message is used for rejecting to reside on the network on which the second terminal currently resides.

Specifically, if the networks on which the first terminal and the second terminal currently reside are different, the first terminal may reject to reside on the network on which the second terminal currently resides. In such a situation, the first terminal may not reply to the second terminal or may reply with a fifth message, wherein the fifth message is used for rejecting to reside on the network on which the second terminal currently resides. In this case, the first terminal may also use the method described in the aforementioned implementation to continue to search for a terminal device on the same network as the first terminal. Or optionally, the fifth message may also include information of a network on which the first terminal currently resides and/or a rejection reason, so that the second terminal may reside on the network on which the first terminal currently resides according to the information of the network on which the first terminal currently resides included in the fifth message, thereby making the first terminal and the second terminal reside on a same network.

Optionally, the rejection reason may include that the networks on which the first terminal and the second terminal currently reside on are different.

Similar to the first message, the second message, the third message and the fourth message described above, the fifth message may also be a discovery message or a direct communication message, which will not be repeated here for sake of conciseness.

Optionally, in some implementations, the method further includes: sending, by the first terminal, a sixth message to the second terminal, wherein the sixth message is used for rejecting the first message.

Optionally, the sixth message may also include a rejection reason, wherein the rejection reason may be that networks on which the first terminal and the second terminal currently reside are different.

That is, the first terminal may first attempt to access the network in which the second terminal locates. If the accessing fails, or if the first terminal rejects to access the network in which the second terminal locates, or rejects the first message, the first terminal may send a fourth message or a fifth message or a sixth message to the second terminal including the information of the network on which the first terminal resides, so that the second terminal resides on the network on which the first terminal currently resides, according to the information of the network on which the first terminal currently resides.

Optionally, in some implementations, the information of the currently-resided network includes at least one of the following: identification information of the currently-resided network, spatial consistency information, and time consistency information, wherein the spatial consistency information indicates whether the currently-resided network is the same as the resided network of last time, and the time consistency information indicates whether the resided network changes within a specific time period.

Specifically, the information of the currently-resided network may include identification information of the currently-resided network, and a corresponding network may be determined through the identification information. Optionally, the information of the currently-resided network may also include spatial consistency information, wherein the spatial consistency information indicates whether the currently-resided network is the same as the resided network of last time. Optionally, the spatial consistency information may be 1-bit information, for example, 0 may be set to represent that the currently-resided network is the same as the resided network of last time, and 1 may be set to represent that the currently-resided network is different from the resided network of last time. If the spatial consistency information indicates that the currently-resided network is the same as the resided network of last time, then the information of the network on which the second terminal currently resides on may only include spatial consistency information, thereby saving signaling overhead. The first terminal may determine the currently-resided network according to the network on which the second terminal resided last time (provided that the first terminal knows the network on which the second terminal resides last time), thereby determining whether the first terminal is in the same network as the second terminal. Optionally, the time consistency information may indicate whether the network on which the second terminal resides changes within a specific time period. Optionally, the time consistency information may also be 1-bit information. 0 may be set to represent that the resided network does not change within a specific time period, 1 is set to represent that the resided network changes within a specific time period. If the time consistency information indicates that the network on which the second terminal resides does not change within a specific time period, the first terminal may directly determine, within the specific time period, the network on which the second terminal resides without receiving indication information sent by the second terminal, and determine the network on which the second terminal currently resides through the indication information, thereby saving signaling overhead.

Optionally, in some implementations, receiving, by the first terminal, the indication information sent by the second terminal, includes: receiving, by the first terminal, the indication information sent by the second terminal, under a situation that the second terminal is powered on, or the resided network changes, or a relay service needs to be transmitted.

Specifically, the second terminal may send indication information to the first terminal when being powered on, so that the first terminal finds the second terminal according to the indication information, thereby determining the second terminal as a relay terminal device between the first terminal and a network terminal in case of determining that the first terminal and the second terminal reside on the same network. Or the second terminal may send the indication information to the first terminal when the network on which the second terminal resides changes, so that the first terminal may choose to search for a relay terminal device again, or the first terminal may choose to reside on the network on which the second terminal resides after the network on which the second terminal resides changes. Optionally, the second terminal may send the indication information when there is a service (which may be a relay service from the first terminal or a relay service from other terminals) that needs to be relayed, so that the first terminal may determine whether the first terminal is in the same network as the second terminal according to the indication information. If the first terminal is in the same network as the second terminal, the first terminal may send the relay service to the second terminal. If the first terminal is in a different network from the second terminal, the first terminal may choose to search for other relay terminal devices or reside on the network on which the second terminal currently resides.

The communication method according to an implementation of the present disclosure is described in detail from the perspective of a first terminal above with reference to FIG. 2, and the communication method according to another implementation of the present disclosure is described in detail from the perspective of a second terminal below with reference to FIG. 3. It should be understood that the description on the first terminal side and the description on the second terminal side correspond to each other, and similar descriptions may refer to the above description, which will not be repeated here to avoid repetition.

FIG. 3 is a schematic flowchart of a communication method 300 according to another implementation of the present disclosure, and as shown in FIG. 3, the method 300 includes acts S310 and S320.

In S310, a second terminal sends indication information to a first terminal, wherein the indication information is used for indicating information of a network on which the second terminal currently resides.

In S320, the second terminal determines whether the first terminal and the second terminal currently reside on a same network according to a reception time and/or a content of a first message.

That is to say, the second terminal may send the indication information to the first terminal so that the first terminal may determine the information of the network on which the second terminal currently resides according to the indication information 1, so that the first terminal may reply to the second terminal with the first message or not reply with the first message, and the second terminal may determine whether the first terminal and the second terminal reside on the same network according to the content or the reception time of the first message.

Optionally, in some implementations, sending, by the second terminal, the indication information to the first terminal, includes: sending, by the second terminal, a second message to the first terminal, wherein the second message includes the indication information.

Optionally, in some implementations, the method further includes: under a situation that it is determined that the first terminal and the second terminal reside on a same network, relaying, by the second terminal, data between the first terminal and the same network.

That is, the first terminal may communicate with a network device through the second terminal, under a situation that the first terminal and the second terminal reside on the same network.

Optionally, in some implementations, determining that the first terminal and the second terminal reside on the same network, includes: determining, by the second terminal, that the first terminal and the second terminal currently reside on the same network, under a situation that the content of the first message indicates that networks on which the first terminal and the second terminal currently reside are the same.

Optionally, in some implementations, determining that the first terminal and the second terminal reside on the same network, includes: determining, by the second terminal, that the first terminal and the second terminal currently reside on the same network, under a situation that the content of the first message indicates that the first terminal has successfully accessed the network on which the second terminal currently resides.

That is to say, that the first terminal and the second terminal reside on the same network may be that the first terminal and the second terminal reside on the same network originally, or that the first terminal and the second terminal currently reside on the same network by making the first terminal reside on the network of the second terminal.

Optionally, in some implementations, determining, by the second terminal, whether the first terminal and the second terminal currently reside on the same network according to the reception time and/or the content of the first message, includes: determining, by the second terminal, that the first terminal and the second terminal currently reside on different networks, if the content of the first message indicates that the first terminal rejects to access the network on which the second terminal currently resides.

Optionally, in some implementations, the first message also includes a rejection reason and/or information of a network on which the first terminal currently resides, wherein the rejection reason includes that networks on which the first terminal and the second terminal currently reside are different.

Optionally, in some implementations, the method further includes: performing, by the second terminal, a residing action according to the information of a network on which the first terminal currently resides contained in the first message, wherein the residing action is used for making the second terminal reside on the network on which the first terminal currently resides.

Optionally, in some implementations, the method further includes: sending, by the second terminal, a third message to the first terminal, wherein the third message is used for indicating that the second terminal has successfully resides on a network on which the first terminal currently resides.

Optionally, in some implementations, the third message is a discovery message or a direct communication message.

Optionally, in some implementations, the method further includes: sending, by the second terminal, a fourth message to the first terminal, wherein the fourth message is used for indicating that the second terminal fails in performing the residing action.

Optionally, in some implementations, the fourth message includes a failure reason, wherein the failure reason includes at least one of the following: a channel quality of a network on which the first terminal currently resides does not meet a preset condition, and the network on which the first terminal currently resides does not allow the second terminal to access.

Optionally, in some implementations, the fourth message is a discovery message or a direct communication message.

Optionally, in some implementations, the method further includes: receiving, by the second terminal, a fifth message sent by the first terminal, wherein the fifth message is used for rejecting the second message.

Optionally, in some implementations, determining, by the second terminal, whether the first terminal and the second terminal currently reside on the same network according to the reception time and/or the content of the first message, includes: determining, by the second terminal, that the first terminal and the second terminal currently reside on different networks, if the reception time of the first message is not within a preset time range.

Specifically, the second terminal may preset a time range, and if the first message is not received within the preset time range, the second terminal may determine that the first terminal and the second terminal are in different networks.

Optionally, in some implementations, the first message is a discovery message or a direct communication message.

Optionally, in some implementations, the same network is any one of the following: a same beam, a cell, a base station, a core network, a Public Land Mobile Network (PLMN), a Tracking Area (TA), a paging area.

Optionally, in some implementations, the information of the currently-resided network includes at least one of the following: identification information of the currently-resided network, spatial consistency information, and time consistency information, wherein the spatial consistency information indicates whether the currently-resided network is the same as the resided network of last time, and the time consistency information indicates whether the resided network changes within a specific time period.

Optionally, in some implementations, sending, by the second terminal, the indication information to the first terminal, includes: sending the indication information to the first terminal, under a situation that the second terminal is powered on, or the resided network changes, or a relay service needs to be transmitted.

Figure 4:
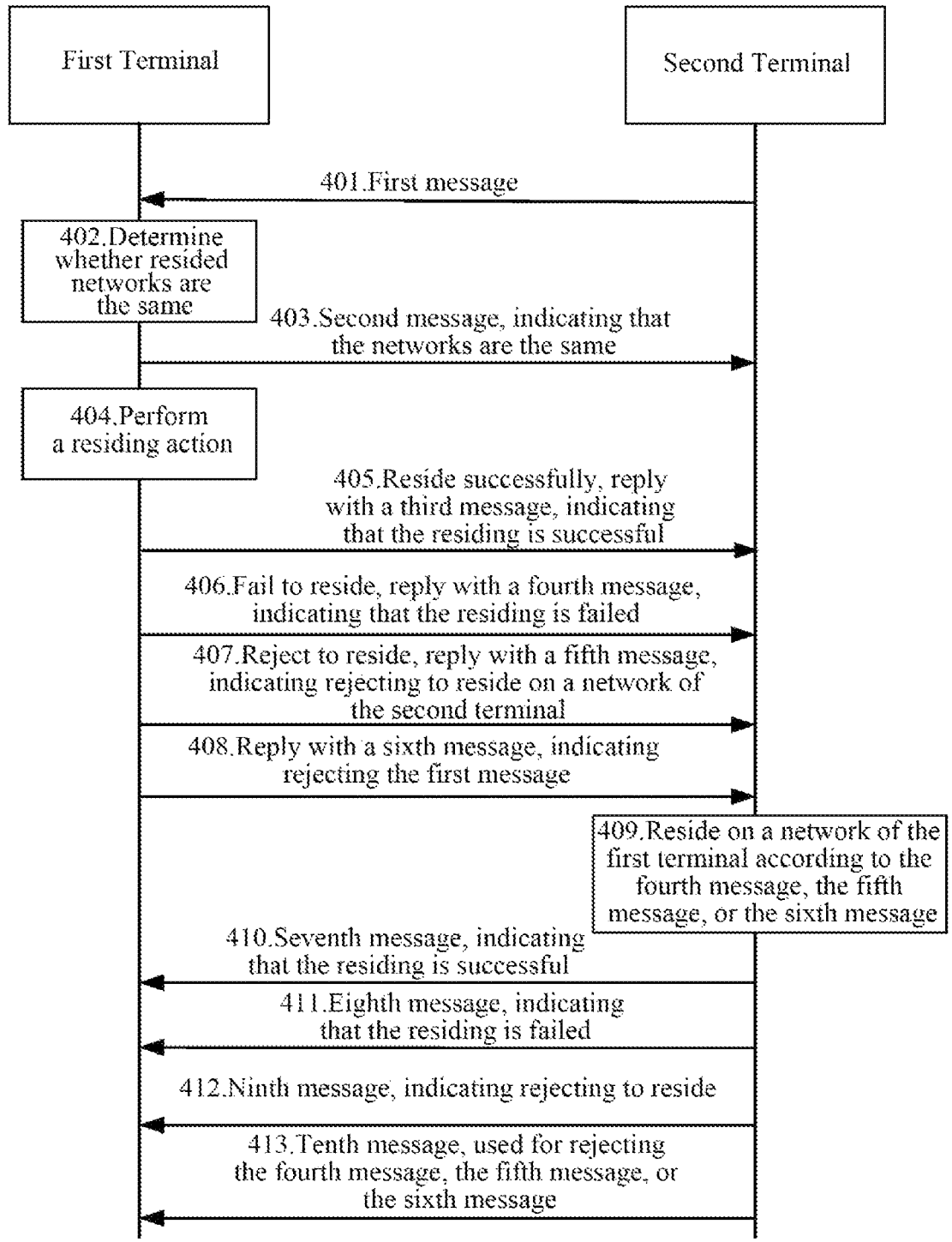
FIG. 4 is a flowchart of a communication method according to yet another implementation of the present disclosure.

Hereinafter, a communication method of an implementation of the present disclosure will be described from the perspective of device interaction with reference to FIG. 4, and as shown in FIG. 4, the method includes acts 401-413.

In 401, the first terminal receives a first message of the second terminal, wherein the first message includes indication information indicating information of a network on which the second terminal currently resides.

Optionally, the first message may be a discovery announcement message, a discovery request message, a direct communication establishment request message, or a direct establishment request acceptance message, etc.

In 402, the first terminal determines whether networks on which the first terminal and the second terminal reside are the same according to the indication information.

If the networks on which the first terminal and the second terminal reside are the same, the first terminal may not reply with any response message, or in 403, the first terminal may reply to the second terminal with a second message, wherein the second message indicates that the networks on which the first terminal and the second terminal reside are the same.

Optionally, the second message may be a discovery announcement message, a discovery request message, a direct communication establishment request message or a direct establishment request acceptance message, etc.

If the networks on which the first terminal and the second terminal reside are different, in 404, the first terminal may perform a residing action according to the indication information for residing on the network on which the second terminal currently resides.

If the resident is successful, the first terminal may not reply with any response message, or in 405, the first terminal may reply to the second terminal with a third message, wherein the third message indicates that the first terminal resides on the network of the second terminal successfully.

Optionally, the third message may be a discovery response message, a direct communication establishment request acceptance message, or the like.

If the resident fails, the first terminal may not reply with any response message, or in 406, the first terminal may reply to the second terminal with a fourth message, wherein the fourth message indicates that the first terminal fails to reside on the network of the second terminal. Optionally, the fourth message may include a failure reason and/or information of a network on which the first terminal currently resides, wherein the failure reason may be that a channel quality of the network on which the second terminal currently resides does not meet a preset condition or the network on which the second terminal currently resides does not allow the terminal device to access. The fourth message may include information of the network on which the first terminal currently resides, so that the second terminal reside on the network on which the first terminal currently resides according to the information of the network on which the first terminal currently resides included in the fourth message.

Optionally, if the first message is a discovery request message, the fourth message may be a discovery response message, and if the first message is a direct connection establishment request message, the fourth message may be a direct communication establishment request rejection message, etc.

Optionally, if the networks on which the first terminal and the second terminal currently reside are different, in 407, the first terminal may reply to the second terminal with a fifth message for indicating the first terminal rejects to reside on the network on which the first terminal currently resides.

Optionally, the fifth message may also include a rejection reason and/or information of a network on which the terminal device currently resides, wherein the rejection reason includes that the networks on which the first terminal and the second terminal currently reside are different.

Optionally, if the first message is a discovery request message, the fifth message may be a discovery response message, and if the first message is a direct connection establishment request message, the fifth message may be a direct communication establishment request rejection message, etc.

Optionally, if the networks on which the first terminal and the second terminal currently reside are different, in 408, the first terminal may reply to the second terminal with a sixth message for indicating rejecting the first message.

Optionally, the sixth message may also include a rejection reason and/or information of a network on which the first terminal currently resides, wherein the rejection reason includes that the networks on which the first terminal and the second terminal currently reside are different.

Optionally, if the first message is a discovery request message, the sixth message may be a discovery response message, and if the first message is a direct connection establishment request message, the sixth message may be a direct communication establishment request rejection message, etc.

In 409, the second terminal may attempt to reside on a network on which the first terminal currently resides, according to information of the network on which the first terminal currently resides included in the fourth message, the fifth message, or the sixth message.

Optionally, if the resident is successful, in 410, the second terminal may send a seventh message to the first terminal, wherein the seventh message may indicate that the second terminal successfully resides on the network on which the first terminal currently resides.

Optionally, the seventh message may be a discovery announcement message, a discovery request message, a direct communication establishment request message or a direct establishment request acceptance message, etc.

Optionally, if the resident fails, in 411, the second terminal may send an eighth message to the first terminal, wherein the eighth message may indicate that the second terminal fails to reside on the network on which the first terminal currently resides.

Optionally, the eighth message may be a discovery announcement message, a discovery request message, a direct communication establishment request message or a direct establishment request acceptance message, etc.

Or, after the second terminal receives the fourth message, the fifth message, or the sixth message of the first terminal, the second terminal may not reply with a response message, or in 412, the second terminal may reply to the first terminal with a ninth message, indicating rejecting to reside on the network on which the first terminal currently resides. Optionally, the ninth message may also include a rejection reason, wherein the rejection reason may be that the networks on which the first terminal and the second terminal currently reside are different.

Optionally, the ninth message may be a discovery response message or a direct establishment request rejection message, etc.

Or, after the second terminal receives the fourth message, the fifth message, or the sixth message of the first terminal, the second terminal may not reply with the response message, or in 413, the second terminal may reply to the first terminal with a tenth message, indicating rejecting the fourth message, the fifth message, or the sixth message. Optionally, the tenth message may also include a rejection reason, wherein the rejection reason may be that the networks on which the first terminal and the second terminal currently reside are different.

Method implementations of the present disclosure are described in detail above with reference to FIGS. 2 to 4, apparatus implementations of the present disclosure are described in detail below with reference to FIGS. 5 to 8. It should be understood that the apparatus implementations and the method implementations correspond to each other, and description of the method implementations may be referred to for similar description of the apparatus implementations.

Figure 5:
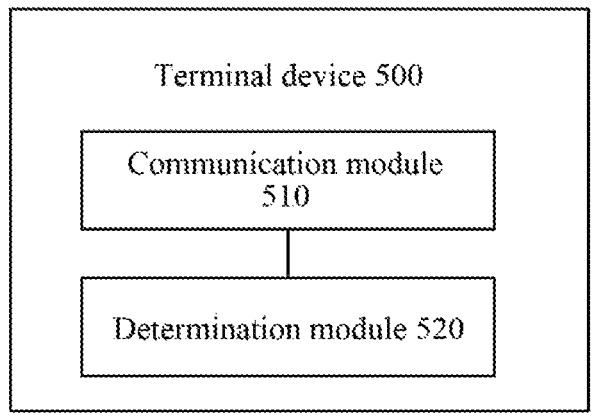
FIG. 5 is a block diagram of a terminal device according to an implementation of the present disclosure.

FIG. 5 is a schematic block diagram of a terminal device 500 according to an implementation of the present disclosure. As shown in FIG. 5, the terminal device 500 includes a communication module 510 and a determination module 520.

The communication module 510 is used for receiving indication information sent by a second terminal, wherein the indication information is used for indicating information of a network on which the second terminal currently resides.

The determination module 520 is used for determining whether the terminal device and the second terminal reside on a same network according to the indication information.

Optionally, in some implementations, the communication module 510 is specifically used for: receiving a first message sent by the second terminal, wherein the first message includes the indication information.

Optionally, in some implementations, the determination module 520 is specifically used for: determining that networks on which the terminal device and the second terminal reside are the same, according to the indication information.

Optionally, in some implementations, the communication module 510 is specifically used for: communicating with the network on which the terminal device and the second terminal currently reside through the second terminal.

Optionally, in some implementations, the communication module 510 is specifically used for: sending a second message to the second terminal, wherein the second message is used for indicating that networks on which the terminal device and the second terminal currently reside are the same.

Optionally, in some implementations, the second message is a discovery message or a direct communication message.

Optionally, in some implementations, the determination module 520 is specifically used for: determining that networks on which the terminal device and the second terminal reside are different, according to the indication information.

Optionally, in some implementations, the communication module 510 is specifically used for: receiving indication information sent by other terminals, wherein the indication information is used for indicating information of networks on which the other terminals currently reside.

The determination module 520 is specifically used for: finding a terminal device on the same network as the terminal device, according to the indication information sent by the other terminals.

Optionally, in some implementations, the terminal device also includes: a residing module, used for performing a residing action, wherein the residing action is used for making the terminal device reside on the network on which the second terminal currently resides.

Optionally, in some implementations, the communication module 510 is further used for: communicating with the same network through the second terminal, under a situation that the terminal device performs the residing action successfully.

Optionally, in some implementations, the communication module 510 is further used for: sending a third message to the second terminal, wherein the third message is used for indicating that the terminal device has successfully resided on the network on which the second terminal currently resides.

Optionally, in some implementations, the third message is a discovery message or a direct communication message.

Optionally, in some implementations, the communication module 510 is further used for: sending a fourth message to the second terminal, wherein the fourth message is used for indicating that the terminal device fails in performing the residing action.

Optionally, in some implementations, the fourth message includes a failure reason and/or information of a network on which the terminal device currently resides, wherein the failure reason includes at least one of the following: a channel quality of the network on which the second terminal currently resides does not meet a preset condition, and the network on which the second terminal currently resides does not allow the terminal device to access.

Optionally, in some implementations, the fourth message is a discovery message or a direct communication message.

Optionally, in some implementations, the communication module 510 is further used for: sending a fifth message to the second terminal, wherein the fifth message is used for rejecting to reside on the network on which the second terminal currently resides.

Optionally, in some implementations, the fifth message also includes a rejection reason and/or information of a network on which the terminal device currently resides, wherein the rejection reason includes that the networks on which the terminal device and the second terminal currently reside are different.

Optionally, in some implementations, the fifth message is a discovery message or a direct communication message.

Optionally, in some implementations, the communication module 510 is further used for: sending a sixth message to the second terminal, wherein the sixth message is used for rejecting the first message.

Optionally, in some implementations, the sixth message includes a rejection reason, wherein the rejection reason includes that the networks on which the terminal device and the second terminal currently reside are different.

Optionally, in some implementations, the same network is any one of the following: a same beam, a cell, a base station, a core network, a Public Land Mobile Network (PLMN), a Tracking Area (TA), a paging area.

Optionally, in some implementations, the information of the currently-resided network includes at least one of the following: identification information of the currently-resided network, spatial consistency information, and time consistency information, wherein the spatial consistency information indicates whether the currently-resided network is the same as the resided network of last time, and the time consistency information indicates whether the resided network changes within a specific time period.

Optionally, in some implementations, the communication module 510 is specifically used for: receiving the indication information sent by the second terminal, under a situation that the second terminal is powered on, or the resided network changes, or a relay service needs to be transmitted.

Specifically, the terminal device 500 may correspond to the first terminal of the communication method 200 or the method described in FIG. 4 according to implementations of the present disclosure, and the device 500 may include an entity unit for performing the method 200 in FIG. 2 or the method performed by the first terminal in FIG. 4. Moreover, various entity units in the device 500 and other operations and/or functions described above are for implementing the corresponding flows of the method 200 in FIG. 2 or the method described in FIG. 4, respectively, and will not be repeated here for sake of conciseness.

Figure 6:
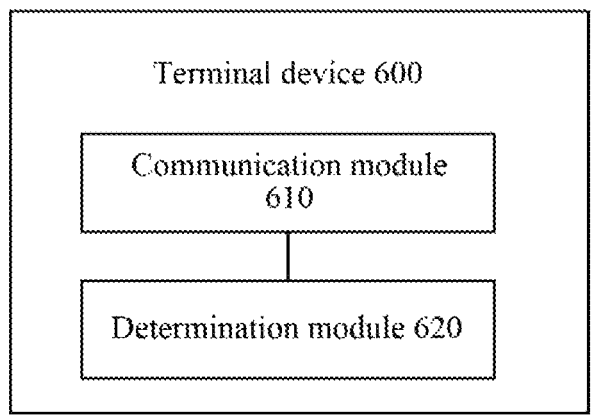
FIG. 6 is a block diagram of a terminal device according to another implementation of the present disclosure.

FIG. 6 is a schematic block diagram of a terminal device 600 according to another implementation of the present disclosure. As shown in FIG. 6, the terminal device 600 includes a communication module 610 and a determination module 620.

The communication module 610 is used for sending indication information to a first terminal, wherein the indication information is used for indicating information of a network on which the terminal device currently resides.

The determination module 620 is used for determining whether the first terminal and the terminal device currently reside on the same network according to a reception time and/or a content of the first message.

Optionally, in some implementations, the communication module 610 is specifically used for: sending a second message to the first terminal, wherein the second message includes the indication information.

Optionally, in some implementations, the communication module 610 is further used for: relaying data between the first terminal and the same network, under a situation that it is determined that the first terminal and the terminal device reside on the same network.

Optionally, in some implementations, the determination module 620 is specifically used for: determining that the first terminal and the terminal device currently reside on the same network, under a situation that the content of the first message indicates that the networks on which the first terminal and the terminal device currently reside are the same.

Optionally, in some implementations, the determination module 620 is specifically used for: determining that the first terminal and the terminal device currently reside on the same network, under a situation that the content of the first message indicates that the first terminal has successfully accessed the network on which the terminal device currently resides.

Optionally, in some implementations, the determination module 620 is specifically used for:

determining that the first terminal and the terminal device currently reside on different networks, if the content of the first message indicates that the first terminal rejects to access the network on which the terminal device currently resides.

Optionally, in some implementations, the first message also includes a rejection reason and/or information of a network on which the first terminal currently resides, wherein the rejection reason includes that the networks on which the first terminal and the terminal device currently reside are different.

Optionally, in some implementations, the terminal device also includes: a residing module, used for performing a residing action according to the information of the network on which the first terminal currently resides contained in the first message, wherein the residing action is used for making the terminal device reside on the network on which the first terminal currently resides.

Optionally, in some implementations, the communication module 610 is further used for: sending a third message to the first terminal, wherein the third message is used for indicating that the terminal device has successfully resides on the network on which the first terminal currently resides.

Optionally, in some implementations, the third message is a discovery message or a direct communication message.

Optionally, in some implementations, the communication module 610 is further used for: sending a fourth message to the first terminal, wherein the fourth message is used for indicating that the terminal device fails in performing the residing action.

Optionally, in some implementations, the fourth message includes a failure reason, wherein the failure reason includes at least one of the following: a channel quality of the network on which the first terminal currently resides does not meet a preset condition, and the network on which the first terminal currently resides does not allow the terminal device to access.

Optionally, in some implementations, the fourth message is a discovery message or a direct communication message.

Optionally, in some implementations, the communication module 610 is further used for: receiving a fifth message sent by the first terminal, wherein the fifth message is used for rejecting the second message.

Optionally, in some implementations, the determination module 620 is further used for: determining that the first terminal and the terminal device currently reside on different networks, if the reception time of the first message is not within a preset time range.

Optionally, in some implementations, the first message is a discovery message or a direct communication message.

Optionally, in some implementations, the same network is any one of the following: a same beam, a cell, a base station, a core network, a Public Land Mobile Network (PLMN), a Tracking Area (TA), a paging area.

Optionally, in some implementations, the information of the currently-resided network includes at least one of the following: identification information of the currently-resided network, spatial consistency information, and time consistency information, wherein the spatial consistency information indicates whether the currently-resided network is the same as the resided network of last time, and the time consistency information indicates whether the resided network changes within a specific time period.

Optionally, in some implementations, the communication module 610 is specifically used for: sending the indication information to the first terminal, under a situation that the terminal device is powered on, or the resided network changes, or a relay service needs to be transmitted.

Specifically, the terminal device 600 may correspond to the second terminal in the communication method 300 or the second terminal in FIG. 4 according to an implementation of the present disclosure, and the device 600 may include an entity unit for performing the method 300 in FIG. 3 or the method performed by the second terminal in FIG. 4. Moreover, various entity units in the device 600 and other operations and/or functions described above are for implementing the corresponding flows of the method 300 in FIG. 3 or the method described in FIG. 4, respectively, and will not be repeated here for sake of conciseness.

Figure 7:
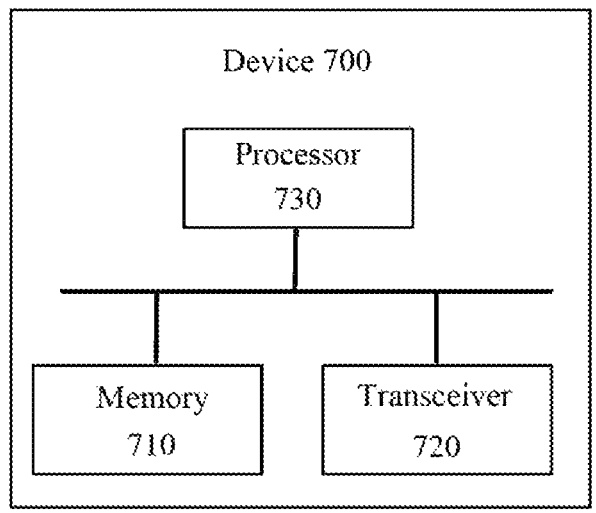
FIG. 7 is a block diagram of a terminal device according to yet another implementation of the present disclosure.

FIG. 7 is a schematic block diagram of a terminal device according to yet another implementation of the present disclosure. The terminal device 700 shown in FIG. 7 includes a memory 710, a transceiver 720 and a processor 730, wherein the memory 710 is used for storing programs, the processor 730 is used for executing program codes stored in the memory 710, and the processor 730 may achieve external communication through the transceiver 720.

Optionally, the processor 730 may call the program codes stored in the memory 710 to execute corresponding operations in the method 200 shown in FIG. 2, which will not be described here repeatedly for sake of conciseness.

It should be understood that, in an implementation of the present disclosure, the processor 730 may be a central processing unit (CPU), or the processor 730 may be another general purpose processor, a digital signal processor (DSP), an application specific integrated circuit (ASIC), a field programmable gate array (FPGA), or other programmable logic device, a discrete gate or a transistor logic device, or a discrete hardware component, etc. The general purpose processor may be a microprocessor, or the processor may be any conventional processor or the like.

The memory 710 may include a read only memory and a random access memory and provide instructions and data to the processor 730. A portion of memory 710 may also include a non-volatile random access memory. For example, the memory 930 may also store device type information.

In an implementation process, acts of the methods described above may be accomplished by integrated logic circuits of hardware in the processor 730 or instructions in a form of software. The acts of the method disclosed in connection with the implementation of the present disclosure may be directly embodied to be completed by an execution of a hardware processor or by a combination of hardware and software modules in a processor. The software modules may be located in typical storage medium in the art, such as a random access memory, flash memory, read-only memory, programmable read-only memory or electrically erasable programmable memory, or register. The storage medium is located in the memory, and the processor 730 reads the information in the memory and accomplishes the acts of the method in combination with its hardware. In order to avoid repetition, it will not be described in detail here.

In a specific implementation mode, the determination module 520 in FIG. 5 may be implemented with the processor 730 of FIG. 7, and the communication module 510 in FIG. 5 may be implemented with the transceiver 720 of FIG. 7.

Figure 8:
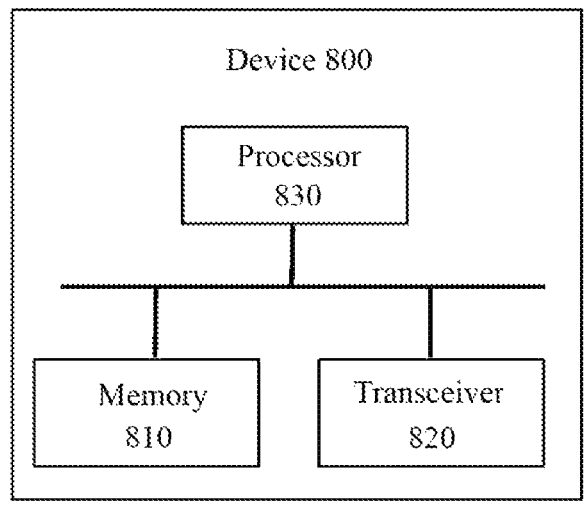
FIG. 8 is a block diagram of a terminal device according to yet another implementation of the present disclosure.

FIG. 8 is a schematic block diagram of a terminal device according to yet another implementation of the present disclosure. The terminal device 800 shown in FIG. 8 includes a memory 810, a transceiver 820 and a processor 830, wherein the memory 810 is used for storing programs, the processor 830 is used for executing program codes stored in the memory 810, and the processor 830 may achieve external communication through the transceiver 820.

Optionally, the processor 830 may call the program codes stored in the storage 810 to perform corresponding operations in the method 300 shown in FIG. 3, which will not be described here repeatedly for sake of conciseness.

It should be understood that, in an implementation of the present disclosure, the processor 830 may be a central processing unit (CPU), or the processor 830 may be another general purpose processor, a digital signal processor (DSP), an application specific integrated circuit (ASIC), a field programmable gate array (FPGA), or other programmable logic device, a discrete gate or a transistor logic device, or a discrete hardware component, etc. The general purpose processor may be a microprocessor, or the processor may be any conventional processor or the like.

The memory 810 may include a read only memory and a random access memory and provide instructions and data to the processor 830. A portion of memory 810 may also include a non-volatile random access memory. For example, the memory 930 may also store device type information.

In an implementation process, acts of the methods described above may be accomplished by integrated logic circuits of hardware in the processor 830 or instructions in a form of software. The acts of the method disclosed in connection with the implementation of the present disclosure may be directly embodied to be completed by an execution of a hardware processor or by a combination of hardware and software modules in a processor. The software modules may be located in typical storage medium in the art, such as a random access memory, flash memory, read-only memory, programmable read-only memory or electrically erasable programmable memory, or register. The storage medium is located in the memory, and the processor 830 reads the information in the memory and accomplishes the acts of the method in combination with its hardware. In order to avoid repetition, it will not be described in detail here.

In a specific implementation mode, the determination module 620 in FIG. 6 may be implemented with the processor 830 of FIG. 8, and the communication module 610 in FIG. 6 may be implemented with the transceiver 820 of FIG. 8.

Those of ordinary skills in the art will recognize that the example elements and algorithm acts described in connection with the implementations disclosed herein can be implemented in electronic hardware, or a combination of computer software and electronic hardware. Whether these functions are implemented in hardware or software depends on the specific application and design constraints of the technical solution. Skilled artisans may use different methods to implement the described functions in respect to each particular application, but such implementation should not be considered to be beyond the scope of the present disclosure.

Those skilled in the art can clearly understand that for convenience and conciseness of description, the specific working processes of the system, apparatus and unit described above may refer to the corresponding processes in the aforementioned method implementations and will not be described here.

In several implementations provided by the present disclosure, it should be understood that the disclosed systems, apparatuses and methods may be implemented in other ways. For example, the apparatus implementations described above are only illustrative, for example, the division of the units is only a logical function division, and there may be other division manners in actual implementation, for example, multiple units or components may be combined or integrated into another system, or some features may be ignored or not executed. On the other hand, the mutual coupling or direct coupling or communication connection shown or discussed may be indirect coupling or communication connection through some interface, apparatus or unit, and may be in electrical, mechanical or other forms.

The unit described as a separate component may or may not be physically separated, and the component shown as a unit may or may not be a physical unit, i.e., it may be located in one place or may be distributed over multiple network units. Some or all of the units may be selected according to actual needs to achieve the purpose of the implementations.

In addition, various functional units in various implementations of the present disclosure may be integrated in one processing unit, or the various units may be physically present separately, or two or more units may be integrated in one unit.

The functions may be stored in a computer readable storage medium if realized in a form of software functional units and sold or used as a separate product. Based on this understanding, the technical solution of the present disclosure, in essence, or the part contributing to the prior art, or the part of the technical solution, may be embodied in the form of a software product stored in a storage medium, including a number of instructions for causing a computer device (which may be a personal computer, a server, or a network device and the like) to perform all or part of the acts of the method described in various implementations of the present disclosure. The storage medium includes various mediums capable of storing program codes such as U disk, mobile hard disk, read-only memory (ROM), random access memory (RAM), magnetic disk or optical disk.

What are described above are merely example implementations of the present disclosure, but the protection scope of the present disclosure is not limited thereto. Any variation or substitution that may be easily conceived by a person skilled in the art within the technical scope disclosed by the present disclosure shall be included within the protection scope of the present disclosure. Therefore, the protection scope of the present disclosure shall be determined by the protection scope of the claims.

What is claimed is:

1. A method for communication, comprising:
   receiving, by a first terminal, indication information sent by a second terminal, wherein the indication information is used for indicating information of a network on which the second terminal currently resides and comprises one of spatial consistency information or the spatial consistency information and time consistency information; and
   determining, by the first terminal, whether the first terminal and the second terminal reside on a same network according to the indication information,
   wherein the spatial consistency information is 1-bit information, wherein the spatial consistency information indicates whether the network on which the second terminal currently resides is the same as a network on which the second terminal resided last time, and wherein the time consistency information indicates whether the network on which the second terminal currently resides changed within a specific time period.

2. The method of claim 1, wherein receiving, by the first terminal, the indication information sent by the second terminal, comprises:
   receiving, by the first terminal, a first message sent by the second terminal, wherein the first message comprises the indication information.

3. The method of claim 1, wherein determining, by the first terminal, whether the first terminal and the second terminal reside on the same network according to the indication information, comprises:
   determining, by the first terminal, that networks on which the first terminal and the second terminal reside are the same, according to the indication information.

4. The method of claim 3, wherein the method further comprises:
   communicating, by the first terminal, with the network on which the first terminal and the second terminal currently reside, through the second terminal.

5. The method of claim 3, wherein the method further comprises:
   sending, by the first terminal, a second message to the second terminal, wherein the second message is used for indicating that the networks on which the first terminal and the second terminal currently reside are the same.

6. The method of claim 5, wherein the second message is a discovery message or a direct communication message.

7. A terminal device, comprising a processor and a transceiver,
   wherein the transceiver is used for receiving indication information sent by a second terminal, wherein the indication information is used for indicating information of a network on which the second terminal currently resides and comprises one of spatial consistency information or the spatial consistency information and time consistency information, wherein the spatial consistency information is 1-bit information, wherein the spatial consistency information indicates whether the network on which the second terminal currently resides is the same as a network on which the second terminal resided last time, and wherein the time consistency information indicates whether the network on which the second terminal currently resides changed within a specific time period; and
   wherein the processor is used for determining whether the terminal device and the second terminal reside on a same network according to the indication information.

8. The terminal device of claim 7, wherein the transceiver is specifically used for:
   receiving a first message sent by the second terminal, wherein the first message comprises the indication information.

9. The terminal device of claim 8, wherein the processor is specifically used for:
   determining that networks on which the terminal device and the second terminal reside are different, according to the indication information.

10. The terminal device of claim 9, wherein the transceiver is specifically used for:
    receiving indication information sent by other terminals, wherein the indication information is used for indicating information of networks on which the other terminals currently reside; and
    the processor is specifically used for:
    finding a terminal device on the same network as the terminal device, according to the indication information sent by the other terminals.

11. The terminal device of claim 9, wherein the processor is further used for performing a residing action, wherein the residing action is used for making the terminal device reside on the network on which the second terminal currently resides.

12. The terminal device of claim 11, wherein the transceiver is further used for:
    communicating with the same network through the second terminal, under a situation that the terminal device performs the residing action successfully.

13. The terminal device of claim 11, wherein the transceiver is further used for:
    sending a third message to the second terminal, wherein the third message is used for indicating that the terminal device has successfully resided on the network on which the second terminal currently resides.

14. The terminal device of claim 13, wherein the third message is a discovery message or a direct communication message.

15. The terminal device of claim 11, wherein the transceiver is further used for:
    sending a fourth message to the second terminal, wherein the fourth message is used for indicating that the terminal device fails in performing the residing action.

16. The terminal device of claim 15, wherein the fourth message comprises at least one of a failure reason or information of a network on which the terminal device currently resides, wherein the failure reason comprises at least one of the following:
    a channel quality of the network on which the second terminal currently resides does not meet a preset condition, and the network on which the second terminal currently resides does not allow the terminal device to access.

17. The terminal device of claim 15, wherein the fourth message is a discovery message or a direct communication message.

18. The terminal device of claim 7, wherein the transceiver is further used for:
sending a fifth message to the second terminal, wherein the fifth message is used for rejecting to reside on the network on which the second terminal currently resides.

19. The terminal device of claim 18, wherein the fifth message further comprises at least one of a rejection reason or information of a network on which the terminal device currently resides, wherein the rejection reason comprises that the networks on which the terminal device and the second terminal currently reside are different.

20. The terminal device of claim 18, wherein the fifth message is a discovery message or a direct communication message.

* * * * *